June 26, 1934.                E. E. HEWITT                1,964,056
                           FLUID PRESSURE BRAKE
                           Filed Dec. 1, 1931

INVENTOR.
ELLIS E. HEWITT
By Wm. M. Cady
ATTORNEY.

Patented June 26, 1934

1,964,056

UNITED STATES PATENT OFFICE 1,964,056

FLUID PRESSURE BRAKE

Ellis E. Hewitt, Edgewood, Pa., assignor to The Westinghouse Air Brake Company, Wilmerding, Pa., a corporation of Pennsylvania Application December 1, 1931, Serial No. 578,246

6 Claims. (Cl. 303—35)

This invention relates to fluid pressure brakes and more particularly to the type adapted to operate upon a reduction in brake pipe pressure to effect an application of the brakes and upon an increase in brake pipe pressure to effect a release of the brakes.

In effecting an application of the brakes, particularly on a long train, it is desirable to so regulate the application that the slack in the train will be gradually and gently gathered before the brakes are applied with force sufficient to decelerate the train in the desired manner. However, in cycling the brakes on a descending grade the regulation of a brake application subsequent to the initial application of the brakes is not necessary, since the slack in the train is gathered by the initial application.

The principal object of my invention is to provide an improved fluid pressure brake equipment for accomplishing the above results.

Figure 1:
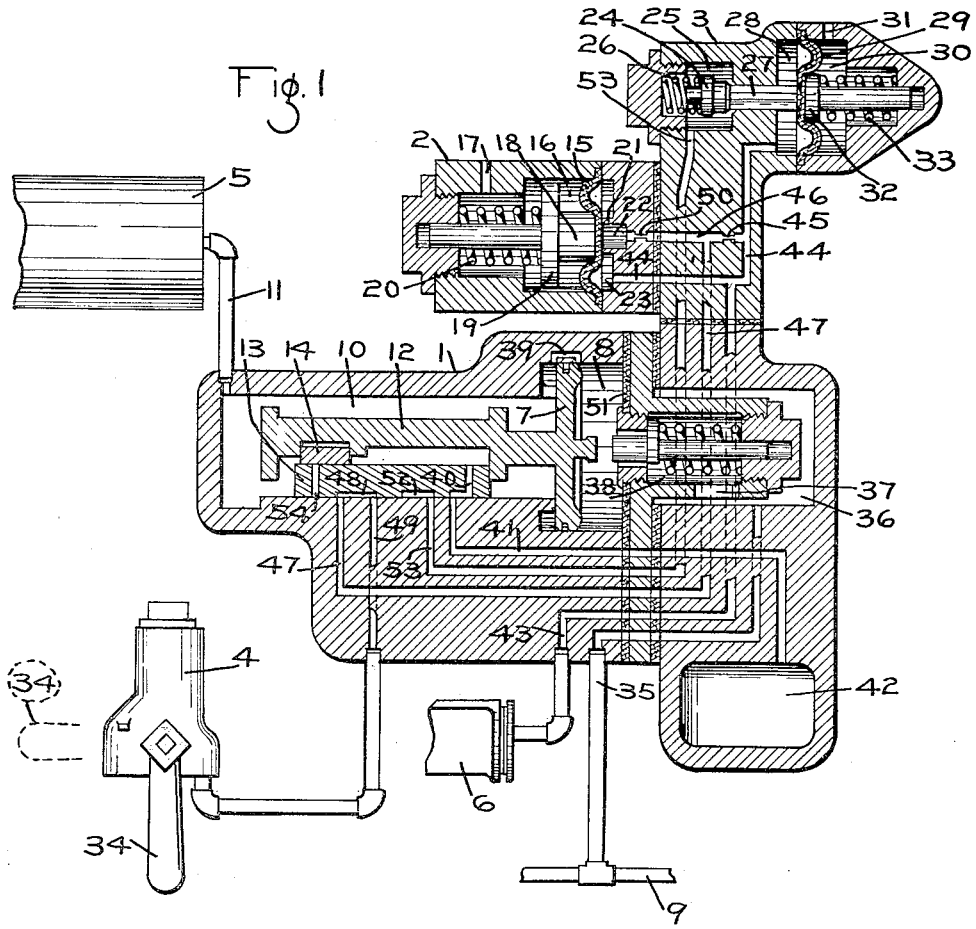
Figure 2:
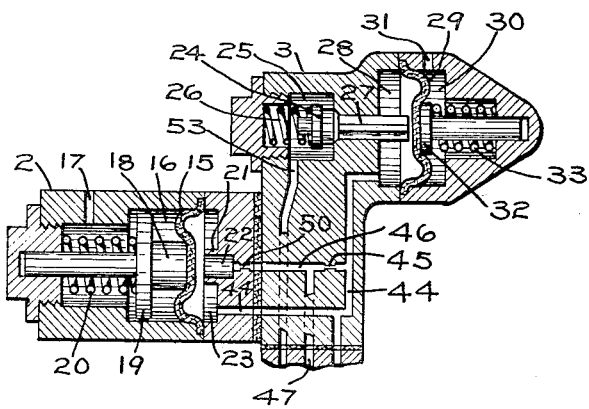

In the accompanying drawing; Fig. 1 is a diagrammatic view of a fluid pressure brake equipment embodying my invention; and Fig. 2 is a view of a portion of the brake equipment shown in Fig. 1, but with the parts shown in another position.

As shown in the drawing, the fluid pressure brake equipment comprises a triple valve device 1, a delay valve device 2, an inshot cut-out valve device 3, a pressure retaining valve device 4, an auxiliary reservoir 5 and a brake cylinder 6.

The triple valve device 1 comprises a casing containing a piston 7 having at one side a chamber 8 connected to the usual brake pipe 9 and having at the other side a valve chamber 10 connected through a passage and pipe 11 to the auxiliary reservoir 5. The piston 7 is provided with a stem 12 for operating a main slide valve 13 and an auxiliary slide valve 14 contained in the valve chamber 10.

The delay valve device 2 comprises a flexible diaphragm 15 having at one side a chamber 16 open to the atmosphere through a passage 17 and containing a plunger 18 engaging said diaphragm. The plunger 18 is provided with a collar 19 loosely fitted in the chamber 16. A spring 20 acting on the collar 19 is provided for urging the diaphragm 15 into engagement with a seat rib 21 formed in the casing at the other side of the diaphragm, said seat rib forming an inner chamber 22, and an outer chamber 23, the outer chamber 23 being at all times connected directly with the brake cylinder 6.

The inshot cut-out valve device 3 comprises a poppet valve 24, contained in a chamber 25, and a spring 26 for urging said valve into engagement with its seat. The poppet valve 24 is provided with a fluted stem 27 extending through a suitable bore in the casing into a chamber 28 which is connected to the brake cylinder 6. A flexible diaphragm 29 is provided and is open at one side to chamber 28 and normally engages the valve stem 27. The diaphragm 29 has at the other side a chamber 30 open to the atmosphere through a passage 31 and containing a plunger 32 and a spring 33 for urging said plunger into engagement with diaphragm 29. The spring 26 acting on the valve 24 is of light value, being merely provided to seat valve 24 in cycling the brakes as will be hereinafter described, while the spring 33 is of such a predetermined value as to overcome spring 26 and thus normally maintain the valve 24 unseated, as shown in Fig. 1.

The pressure retaining valve device 4 may be of the usual type provided with a cut-out position in which the handle 34 is in a vertical position, and a cut-in position in which the handle 34 is in a horizontal position. When the handle 34 is in the vertical position, the retaining valve device has no control over the release of fluid under pressure from the brake cylinder 6, but when said handle is in the horizontal position, the retaining valve device is adapted to retain a predetermined pressure in the brake cylinder, when the triple valve device is operated to effect a release of the brakes as will be hereinafter described.

In operation, to initially charge the brake equipment, fluid under pressure is supplied to brake pipe 9 in the usual manner and flows from the brake pipe through pipe and passage 35 to a chamber 36, thence through a passage 37, and chamber 38 to chamber 8 of the triple valve device.

Assuming the triple valve device 1 in the release position shown in the drawing, fluid under pressure flows from chamber 8 through a feed groove 39 to valve chamber 10 and from thence through pipe 11 to the auxiliary reservoir 5. From valve chamber 10, fluid under pressure also flows through a port 40 in the triple valve slide valve 13 to passage 41 leading to an inshot reservoir or chamber 42. In this manner the auxiliary reservoir 5 and inshot reservoir 42 are charged with fluid at brake pipe pressure.

With the triple valve device in the release position, the brake cylinder 6 is vented to the atmosphere through pipe and passage 43, passage 44, a choke 45, passage 46, passage 47, a cavity 48 in the triple valve slide valve 14, passage and pipe 49 and through the retaining valve device 4, which until otherwise specified, will be considered in the cut-out position with the handle 34 in the vertical position. Since passage 44, through which the brake cylinder 6 is vented, communicates with diaphragm chamber 28 of the inshot cut-out valve device 3 and with diaphragm chamber 23 of the delay valve device 2, said chambers are normally at atmospheric pressure, also chamber 22 within the seat rib 21 of the delay valve device is at atmospheric pressure, said chamber 22 being vented through a choke plug 50 and passage 46 which leads to passage 47. As a result, spring 20 presses the delay valve diaphragm 15 into engagement with seat rib 21, and spring 33 unseats the inshot cut-off valve 24 as shown in Fig. 1 of the drawing.

If it is desired to effect an application of the brakes, a gradual reduction in brake pipe pressure is effected in the usual manner and thus the pressure is reduced in piston chamber 8. When a predetermined reduction is thus effected in chamber 8, the pressure of fluid in valve chamber 10 moves the piston 7 and slide valves 13 and 14 to application position in which the piston 7 engages a gasket 51.

In application position of the triple valve device, a cavity 52 in the main slide valve 13 connects passage 41 from the inshot reservoir 42 to a passage 53. This permits fluid under pressure to flow from the inshot reservoir 42 through passage 53 to the inshot cut-off valve chamber 25. With the cut-off valve 24 unseated, fluid flows from chamber 25 to chamber 28 and from thence through passage 44 and passage and pipe 43 to the brake cylinder 6. In this manner fluid under pressure is permitted to quickly flow from the inshot reservoir 42 and equalize into the brake cylinder 6, thereby effecting an application of the brakes, which is light enough to permit the slack in the train to run in gradually and gently.

At the same time that fluid under pressure is vented from the inshot reservoir 42 to the brake cylinder 6, fluid under pressure is also supplied from the valve chamber 10 and connected auxiliary reservoir 5 to the brake cylinder through a port 54, passages 47 and 46, choke 45, passage 44 and passage and pipe 43. This supply of fluid under pressure to the brake cylinder is restricted by the choke 45 so as to effect a gradual application of the brakes at such a rate that the slack in the train is prevented from running in too harshly.

Fluid at the pressure supplied by the triple valve device to passage 46 leading to the brake cylinder, flows through choke 50 to chamber 22 and acts on the delay valve diaphragm 15 within the seat rib 21, while fluid at the pressure in the brake cylinder 6 is supplied from passage 44, which is open to the brake cylinder through passage and pipe 43, to chamber 23 outside of the seat rib 21. When the brake cylinder pressure and the pressure acting in chamber 23 is built up to a predetermined degree, the delay valve diaphragm 15 is deflected away from the seat rib 21, against the opposing pressure of the spring 20. With the diaphragm 15 moved away from seat rib 21, fluid under pressure supplied by the triple valve device through passage 47, passage 46 and choke 50 to chamber 22, flows from the chamber 22 to chamber 23 and from thence through passage 44 and passage and pipe 43 to the brake cylinder 6. The rate at which fluid under pressure is finally supplied to the brake cylinder 6 as just described, is increased over the gradual supply through choke 45 by a degree equal to the flow capacity of choke 50 and is adapted to decelerate the train in the desired manner.

Fluid under pressure supplied to passage 44 leading to the brake cylinder also flows to diaphragm chamber 28 and deflects the diaphragm 29 toward the right hand against the opposing pressure of spring 33. This permits spring 26 to seat the valve 24 for reasons which will be hereinafter described.

It will now be evident that in effecting an application of the brakes, fluid under pressure is supplied to the brake cylinder at three distinct rates, there being the initial rapid inshot from reservoir 42 for initiating the application of brakes and for starting a gentle gathering of the slack in the train. Following the initial inshot, there is a gradual supply of fluid under pressure through choke 45 for completely and effectively gathering the slack. At the end of the slack gathering period, as determined by a predetermined increase in brake cylinder pressure, the delay valve device 2 is operated to increase the rate at which fluid under pressure is supplied to the brake cylinder so as to stop or decelerate the train as desired.

To effect a release of the brakes after an application, fluid under pressure is supplied to the brake pipe 9 and from thence flows to the triple valve piston chamber 8. Upon a predetermined increase in pressure in chamber 8, the triple valve piston 7 and slide valves 13 and 14 are moved from application position to the release position shown in the drawing.

In release position of the triple valve device, fluid under pressure flows from piston chamber 8 through feed passage 39 to valve chamber 10 and thence through pipe 11 to the auxiliary reservoir 5, thus charging said reservoir. From chamber 10 fluid under pressure also flows through port 40 in the main slide valve 13 and passage 41 to the inshot reservoir 42 so as to charge said reservoir. Fluid under pressure is vented from the brake cylinder 6 through pipe and passage 43, passage 44, choke 45, passages 46 and 47, cavity 48 in the main slide valve 13, passage and pipe 49 and through the retaining valve device 4 to the atmosphere.

Since in effecting an application of the brakes, the delay valve diaphragm 15 is moved away from seat rib 21, fluid under pressure is also vented from the brake cylinder 6, in effecting a release of the brakes, by way of passage 44, chambers 23 and 22, choke 50 and through passage 46. When the brake cylinder pressure is thus reduced to below the value of spring 20, said spring deflects the diaphragm 15 into engagement with seat 21, after which, the further and final release of fluid under pressure from the brake cylinder occurs only through choke 45, as above described. Also, when the brake cylinder pressure acting in diaphragm chamber 28 is reduced to below the value of spring 33, said spring deflects diaphragm 29 and unseats valve 24, so that when the next application of brakes is effected, there will be the initial inshot of fluid under pressure to the brake cylinder, as hereinbefore described.

In cycling operation on a descending grade, handle 34 of the retaining valve device is turned to the horizontal position so as to control the release of fluid under pressure from the brake cylinder 6 and to retain a predetermined pressure in the brake cylinder while the triple valve device is in release position and the auxiliary reservoir is being recharged from the brake pipe preparatory to again applying the brakes.

The pressure retained in the brake cylinder 6 acts in chamber 28 to hold the diaphragm 29 in its right hand position, permitting the valve 24 to remain seated. However, the retained brake cylinder pressure acting on diaphragm chamber 23 of the delay valve device 2 is insufficient to hold the delay valve diaphragm 15 deflected away from seat rib 21.

In applying the brakes, subsequent to the initial application in cycling operation, the inshot valve 24 being seated prevents the inshot of fluid under pressure from the reservoir 42 to the brake cylinder 6 as in the initial application, but otherwise the application of brakes is effected in the same manner as the initial application.

In the initial application of brakes, fluid under pressure supplied from the inshot reservoir to the brake cylinder is adapted to first displace the brake cylinder piston and then build up a predetermined pressure in the brake cylinder for applying the brakes lightly to initiate the gathering of the slack in the train. With the retaining valve device 4 adjusted to retain a pressure in the brake cylinder 6 sufficient to hold the brake cylinder piston in the brake application position with the brakes applied with a predetermined pressure, if fluid under pressure were permitted to equalize from the inshot reservoir 42 into the brake cylinder as in the initial application of brakes, the brake cylinder pressure obtained thereby would be undesirably high. Consequently, in accordance with my invention, the inshot cut-off valve 24 is provided and is seated when pressure is retained in the brake cylinder, so that, as hereinbefore described, fluid under pressure is not vented from the inshot reservoir 42 to the brake cylinder in applying the brakes after the initial application, in cycling operation.

In order to effect a complete release of the brakes at the completion of cycling, fluid under pressure is supplied to the brake pipe 9 to shift the triple valve device to release position for charging the auxiliary reservoir 5 and for establishing communication through which fluid under pressure is released from the brake cylinder 6, and handle 34 of the retaining valve device 4 is turned to the vertical position for permitting a complete release of the brakes to be effected.

From the above description of operation, it will be noted that the improved brake controlling valve device operates, with the retaining valve device in cut-out position, to supply fluid under pressure to the brake cylinder 6 at three different rates, that is, the initial inshot and then the slow build-up for gathering the train slack and finally the third rate for decelerating the train. In cycling operation on a descending grade, with the retaining valve device in cut-in position, a valve device is operated by the pressure of fluid retained in the brake cylinder from the initial application of brakes to prevent the inshot of fluid under pressure from the reservoir 42 to the brake cylinder in subsequent applications of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a brake cylinder, an auxiliary reservoir and another reservoir, of a brake controlling valve device operative upon a reduction in brake pipe pressure to establish a communication through which fluid under pressure is supplied from the second mentioned reservoir to said brake cylinder, and valve means subject at all times to the pressure of fluid in said brake cylinder and operative upon a predetermined increase in brake cylinder pressure to close said communication, said brake controlling valve device being also operative upon a reduction in brake pipe pressure to supply fluid under pressure from said auxiliary reservoir to said brake cylinder independently of said valve means.

2. In a fluid pressure brake, the combination with a brake pipe, a brake cylinder, an auxiliary reservoir and another reservoir, of a brake controlling valve device operative upon a reduction in brake pipe pressure to establish a communication through which fluid under pressure is supplied from said auxiliary reservoir to said brake cylinder and to establish another communication through which fluid under pressure is supplied from said other reservoir to said brake cylinder, and valve means for controlling only the second mentioned communication and operated upon a predetermined increase in brake cylinder pressure for closing the second mentioned communication.

3. In a fluid pressure brake, the combination with a brake pipe, a brake cylinder, and a reservoir normally charged with fluid under pressure, of a brake controlling valve device operative upon a reduction in brake pipe pressure to establish a communication through which fluid under pressure is supplied from said reservoir to said brake cylinder and operative upon an increase in brake pipe pressure to establish another communication through which fluid under pressure is vented from the brake cylinder to effect a release of the brakes, means for closing the last mentioned communication when the pressure of fluid in said brake cylinder is reduced to a predetermined degree, and valve means operated by the pressure of fluid retained in the brake cylinder by said means for closing the first mentioned communication.

4. In a fluid pressure brake, the combination with a brake pipe, a brake cylinder, and a reservoir normally charged with fluid under pressure, of a brake controlling valve device operative upon a reduction in brake pipe pressure to establish a communication through which fluid under pressure is supplied from said reservoir to said brake cylinder and operative upon an increase in brake pipe pressure to establish another communication through which fluid under pressure is vented from the brake cylinder to effect a release of the brakes, valve means operative upon a predetermined increase in brake cylinder pressure to close the first mentioned communication, and means operative, in releasing the brakes, to retain a pressure in the brake cylinder for maintaining said valve means in the position for closing said first mentioned communication.

5. In a fluid pressure brake, the combination with a brake pipe, a brake cylinder, an auxiliary reservoir, and another reservoir, of a brake controlling valve device operative upon a reduction in brake pipe pressure to supply fluid under pressure from said auxiliary reservoir to said brake cylinder, a choke for restricting said supply, said brake controlling valve device being also operative upon a reduction in brake pipe pressure to establish a communication through which fluid under pressure is supplied from said other reservoir to said brake cylinder at an unrestricted rate, means operated upon obtaining a predetermined pressure in the brake cylinder for closing said communication and for opening a by-pass around said choke, said brake controlling valve device being operative upon an increase in brake pipe pressure to supply fluid under pressure to said reservoirs and to establish another communication through which fluid under pressure is released from said brake cylinder, and valve means for controlling the release communication and operative to retain a pressure in the brake cylinder for maintaining said means in the position in which the first mentioned communication is closed and said by-pass is open.

6. In a fluid pressure brake, the combination with a brake pipe, a brake cylinder, an auxiliary reservoir, an inshot reservoir, valve means for retaining a predetermined pressure in the brake cylinder in effecting a release of the brakes, and a brake controlling valve device operated upon a reduction in brake pipe pressure to supply fluid under pressure from said auxiliary reservoir to said brake cylinder, and also to establish a communication through which fluid under pressure is supplied from the inshot reservoir to said brake cylinder, and a valve device operated upon a predetermined increase in brake cylinder pressure and by the pressure of fluid retained in the brake cylinder by said valve means for closing said communication, said valve device comprising a valve, a spring for operating said valve to close said communication, a movable abutment for operating said valve to open said communication and subject on one side to the pressure of fluid in said brake cylinder, and a control spring acting on the other side of said abutment.

ELLIS E. HEWITT.